United States Patent
Hom et al.

(10) Patent No.: US 11,009,966 B2
(45) Date of Patent: May 18, 2021

(54) SYSTEMS AND METHODS FOR PROCESSING OF PHYSICAL INTERACTION WITH INTERFACE DEVICE OF INFORMATION HANDLING SYSTEM BASED ON SENSOR INFORMATION INDICATIVE OF HUMAN PROXIMITY

(71) Applicant: Dell Products L.P., Round Rock, TX (US)

(72) Inventors: Bo Hom, Round Rock, TX (US); H. Giray Kaya, Austin, TX (US); Karunakar Palicherla Reddy, Austin, TX (US); Alvaro Pareja, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/004,732

(22) Filed: Jun. 11, 2018

(65) Prior Publication Data
US 2019/0377421 A1 Dec. 12, 2019

(51) Int. Cl.
*G06F 3/023* (2006.01)
*G06F 9/4401* (2018.01)

(52) U.S. Cl.
CPC .............. *G06F 3/023* (2013.01); *G06F 9/442* (2013.01); *G06F 9/4403* (2013.01)

(58) Field of Classification Search
CPC ......... G06F 3/023; G06F 9/4403; G06F 9/442
See application file for complete search history.

(56) References Cited

U.S. PATENT DOCUMENTS

| | | | |
|---|---|---|---|
| 7,257,714 B1* | 8/2007 | Shen | G07C 9/257 713/186 |
| 7,519,763 B2* | 4/2009 | McLean | G06F 12/1433 711/100 |
| 2008/0169902 A1* | 7/2008 | Shiroyama | H04N 21/42204 340/5.83 |
| 2017/0116455 A1* | 4/2017 | Alameh | G06F 1/3215 |
| 2019/0012180 A1* | 1/2019 | Lai | G11C 16/20 |

* cited by examiner

Primary Examiner — Kenneth B Lee, Jr.
(74) Attorney, Agent, or Firm — Jackson Walker L.L.P.

(57) ABSTRACT

In accordance with embodiments of the present disclosure, an information handling system may include a user interface comprising an interface device, one or more sensors, each respective sensor configured to detect a respective parameter indicative of human proximity to the interface device, and a processor communicatively coupled to the user interface and the one or more sensors. The processor may be configured to in response to a physical interaction with the interface device, read information from the one or more sensors, determine whether the information from the one or more sensors satisfies a condition indicative of human proximity to the interface device, and process the physical interaction with the interface device based on whether the condition is satisfied.

21 Claims, 1 Drawing Sheet

SYSTEMS AND METHODS FOR PROCESSING OF PHYSICAL INTERACTION WITH INTERFACE DEVICE OF INFORMATION HANDLING SYSTEM BASED ON SENSOR INFORMATION INDICATIVE OF HUMAN PROXIMITY

TECHNICAL FIELD

The present disclosure relates in general to information handling systems, and more particularly to processing of physical interaction with an interface device, such as a push button, of an information handling system based on sensor information indicative of human proximity.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include push buttons or other interface devices to allow a user to interact with the information handling system. A non-limiting example of such a push button is a power button which a user may press in order to power on or power off the information handling system, wake the information handling system from a reduced power state, and/or other functionality. In some instances, certain interactions with a power button may cause performance of other functionality besides power operations. For example, in some instances, in response to a user pressing and holding a power button for more than a minimum amount of time (and, in some instances, less than a maximum amount of time), an information handing system may be configured to delete all or a portion of a memory of the information handling system.

However, such a power button may be susceptible to being pressed accidentally by an object other than a person. For example, in an information handling system packed in a book bag, a power button may be unintentionally pressed and released as the book bag is repeatedly picked up and placed down on the ground or other surface while a user thereof is waiting in a line. As another example, in an information handling system packed in an item of over-stuffed luggage and placed in a vehicle, a power button may be unintentionally pressed and released as the vehicle drives over bumps of a road upon which the vehicle drives. As a further example, students may, at the end of a day of instruction, individually load information handling systems into a cart, and while doing so, accidentally cause a power button to be unintentionally pressed and released. Such unintentional physical interaction with a button may cause undesirable power cycling of the information handling system, accidental erasure of memory of the information handling system, and/or other deleterious effects.

SUMMARY

In accordance with the teachings of the present disclosure, one or more disadvantages and problems associated with physical interaction with an interface device of an information handling system may be reduced or eliminated.

In accordance with embodiments of the present disclosure, an information handling system may include a user interface comprising an interface device, one or more sensors, each respective sensor configured to detect a respective parameter indicative of human proximity to the interface device, and a processor communicatively coupled to the user interface and the one or more sensors. The processor may be configured to in response to a physical interaction with the interface device, read information from the one or more sensors, determine whether the information from the one or more sensors satisfies a condition indicative of human proximity to the interface device, and process the physical interaction with the interface device based on whether the condition is satisfied.

In accordance with these and other embodiments of the present disclosure, a method may be provided for use in an information handling system comprising a user interface comprising an interface device and one or more sensors, each respective sensor configured to detect a respective parameter indicative of human proximity to the interface device. The method may include in response to a physical interaction with the interface device, reading information from the one or more sensors, determining whether the information from the one or more sensors satisfies a condition indicative of human proximity to the interface device, and processing the physical interaction with the interface device based on whether the condition is satisfied.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to, in an information handling system comprising a user interface comprising an interface device and one or more sensors, each respective sensor configured to detect a respective parameter indicative of human proximity to the interface device, the method comprising: in response to a physical interaction with the interface device, read information from the one or more sensors; determine whether the information from the one or more sensors satisfies a condition indicative of human proximity to the interface device; and process the physical interaction with the interface device based on whether the condition is satisfied.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring

DETAILED DESCRIPTION

Figure 1:
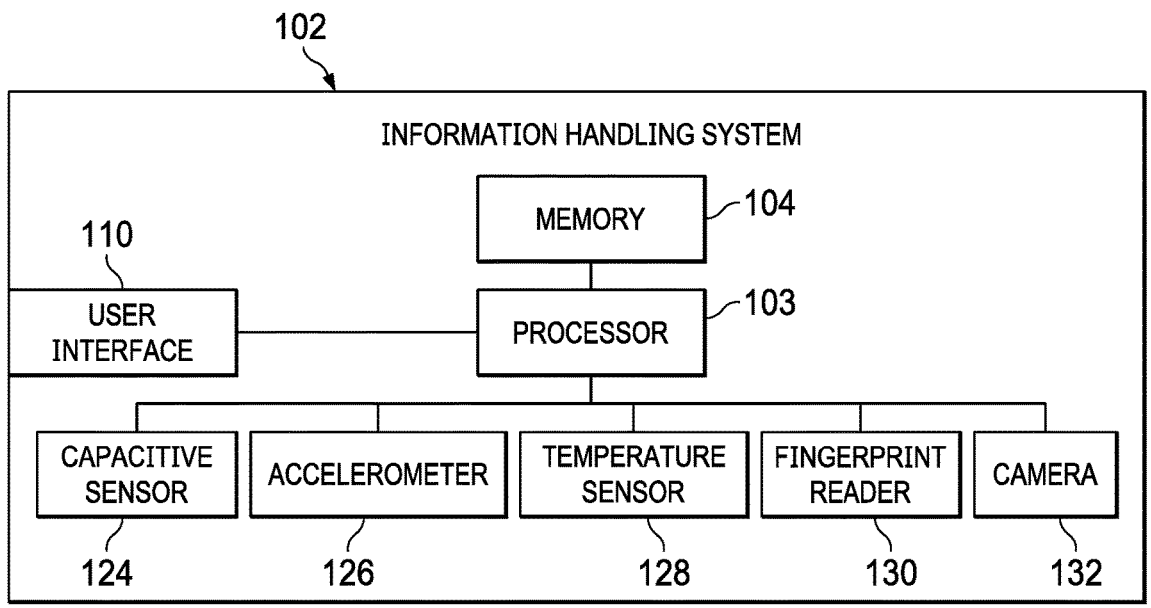
FIG. 1 illustrates a block diagram of an example information handling system, in accordance with certain embodiments of the present disclosure.
Figure 2:
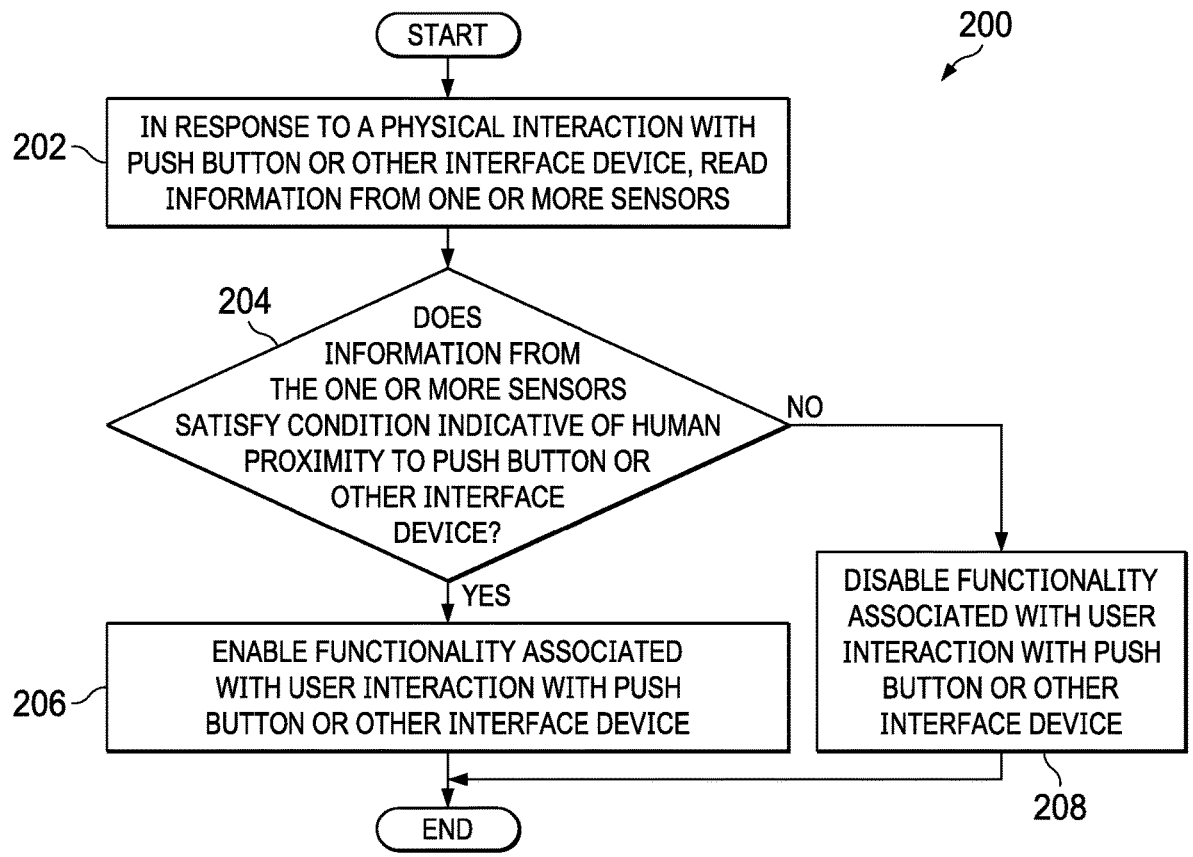
FIG. 2 illustrates a flow chart of an example method for processing of physical interaction with an interface device of an information handling system based on sensor information indicative of human proximity, in accordance with certain embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a user interface 110 communicatively coupled to processor 103, and a plurality of sensors communicatively coupled to processor 103, wherein such sensors may include one or more of a capacitive sensor 124, an accelerometer 126, a temperature sensor 128, a fingerprint reader 130, a camera 132, and/or any other suitable sensor.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device. In some embodiments, user interface 110 may include a push button or an interface device functionally equivalent thereto, via which a user may invoke a defined functionality of information handling system 102 via pressing and/or releasing such push button. For example, in some embodiments, user interface 110 may include a power button, via which a user may interact by pressing and/or releasing such power button to power on or power off information handling system 102. In some of such embodiments, a power button may enable other functionality, such as erasing all or a portion of memory 104 in response to a user pressing and holding the power button for a defined period of time prior to releasing the power button.

A capacitive sensor 124 may include any suitable system, device, or apparatus configured to detect and measure anything that is conductive or has a dielectric different from air. For example, capacitive sensor 124 may sense a change of capacitance that occurs upon a surface of information handling system 102 in response to a human finger touching such surface. Accordingly, capacitive sensor 124 may be integrated into a push button of user interface 110 such that when such push button is interacted with by a human finger, capacitive sensor 124 may detect a change in capacitance indicative of human interaction with the push button. Similarly, when the push button is interacted with by an inanimate object, capacitive sensor 124 may detect no change in capacitance, thus indicating that the physical interaction with the push button was by an object other than a human finger.

Accelerometer 126 may be communicatively coupled to processor 103, and may include any system, device, or apparatus configured to measure acceleration (e.g., proper acceleration) experienced by information handling system 102. Accordingly, accelerometer 126 may measure a gravitational orientation of information handling system 102. Thus, accelerometer 126 may sense whether information handling system 102 has an orientation consistent with a typical use manner of information handling system 102, which may be indicative of human proximity to information handling system 102. Consequently, when a push button is interacted with, the orientation detected by accelerometer 126 may be indicative of whether a human is proximate to information handling system 102 at the time of the interaction with the push button, which may also serve as an indication of whether the interaction with the push button was by a human.

Temperature sensor 128 may comprise any system, device, or apparatus (e.g., a thermometer, thermistor, etc.) configured to sense a temperature proximate to or within information handling system 102. Because humans generate heat from their bodies, the sensing of temperature sensor 128 may be indicative of whether a human is proximate to information handling system 102 or a component thereof. Accordingly, temperature sensor 128 may be integrated into a push button of user interface 110 such that when such push button is interacted with by a human finger, temperature sensor 128 may detect a change in temperature indicative of human interaction with the push button. Similarly, when the push button is interacted with by an inanimate object, temperature sensor 128 may detect a change in temperature not consistent with human interaction with the push button, thus indicating that the physical interaction with the push button was by an object other than a human finger. As a specific example, in some embodiments, information handling system 102 may include two temperature sensors 128: a first temperature sensor 128 integrated with a push button and a second temperature sensor 128 located elsewhere on the exterior surface of information handling system 102. The respective temperatures of such temperature sensors 128 may be indicative of whether a human finger is interacting with the push button. For example, in some instances, a relative difference of the two respective temperatures may be indicative of whether a human finger is interacting with the push button. As another example, in these and other instances, a comparison of a change in temperature versus time of the two respective temperatures may be indicative of whether a human finger is interacting with the push button.

Fingerprint reader 130 may comprise any system, device, or apparatus configured to capture an image of a fingerprint of a human. In some embodiments, a fingerprint reader 130 may be integrated into a push button of user interface 110 such that when such push button is interacted with by a human finger, fingerprint reader 130 may capture an image consistent with a human fingerprint, which may be indicative of human interaction with the push button. Similarly, when the push button is interacted with by an inanimate object, fingerprint reader 130 may detect no fingerprint, thus indicating that the physical interaction with the push button was by an object other than a human finger. In some embodiments, it may be desirable that interaction with a push button only be processed when the fingerprint captured by fingerprint reader 130 is that of an authorized user of information handling system 102 (e.g., power on or erase memory only if captured fingerprint is that of authorized user). In these and other embodiments, fingerprint reader 130 may not be integrated within a push button (may be located elsewhere on the exterior of information handling system), but processing of interaction with a push button of user interface 110 may nonetheless be conditioned on the fingerprint reader 130 capturing a fingerprint of a human (or, as appropriate, a fingerprint of a human who is an authorized user of information handling system 102).

Camera 132 may comprise any system, device, or apparatus configured to record images (moving or still) into one or more electrical signals that may be processed by processor 103. In some embodiments, an image captured by camera 132 may be indicative of human proximity to information handling system 102, such that when a push button is interacted with by a human finger, camera 132 may capture an image consistent with a human face, which may be indicative of human interaction with the push button. Similarly, when the push button is interacted with by an inanimate object, camera 132 may detect no human face, thus indicating that the physical interaction with the push button was by an object other than a human finger. In some embodiments, it may be desirable that interaction with a push button only be processed when an image captured by camera 132 is that of an authorized user of information handling system 102 (e.g., power on or erase memory only if captured image is that of authorized user).

In addition to processor 103, memory 104, user interface 110, capacitive sensor 124, accelerometer 126, temperature sensor 128, fingerprint reader 130, and camera 132, information handling system 102 may include one or more other information handling resources, including one or more other sensors. For example, while only particular sensors (e.g., capacitive sensor 124, accelerometer 126, temperature sensor 128, fingerprint reader 130, and camera 132) are shown in FIG. 1 for the purposes of clarity and exposition, information handling system 102 may include one or more other sensors in addition to or in lieu of those shown in FIG. 1, including without limitation photo sensors (e.g., for sensing a presence or intensity of light), a specific absorption rate sensor, an acoustic sensor (e.g., for detecting ultrasonic frequencies emitted by a human user, recognizing the voice of a human user, etc.), moisture sensor, a radio frequency detector (e.g., for detecting a human "antenna effect"), an infrared sensor (e.g., for detecting heat consistent with a human), and/or other sensor for detecting electromagnetic energy indicative of human proximity.

In operation, processor 103 may be configured to, in response to a physical interaction with a push button or other interface device of user interface 110, read information from one or more sensors (other than the push button or other interface device itself), determine whether information from the one or more sensors satisfies a condition indicative of human proximity to the push button, and process the physical interaction with the push button responsive to whether the condition is satisfied. For example, if the condition is satisfied, processor 103 may enable functionality associated with user interaction with the push button (e.g., power on, power off, erase memory). Alternatively, if the condition is not satisfied, processor 103 may disable functionality associated with user interaction with the push button.

A condition indicative of human proximity may be the satisfaction by information sensed by one or more sensors of one or more criteria relating to the sensor information. For example, for sensors which may be more reliable in indicating human proximity (e.g., facial recognition of appropriate face by camera 132, detection of appropriate fingerprint by fingerprint reader 130), a condition indicative of human proximity may be satisfied by information from a single sensor meeting a single criteria (e.g., camera 132 senses human face, camera 132 senses face of authorized user, fingerprint reader 130 senses human fingerprint, fingerprint reader 130 senses fingerprint of authorized user). For sensors which may be less reliable in indicating human proximity (e.g., capacitive sensor 124, temperature sensor 128, accelerometer 126), a condition indicative of human proximity may be satisfied by information from a minimum of such sensors each meeting their own respective criteria (e.g., two or more of capacitive sensor 124, temperature sensor 128, accelerometer 126 each sensing measured parameters for the sensors within a respective defined range, all three of capacitive sensor 124, temperature sensor 128, accelerometer 126 each sensing measured parameters for the sensors within a respective defined range, etc.).

Although for purposes of clarity and exposition, the functionality described above is contemplated to be executed by processor 103 in the role of a central processing unit (e.g., by an operating system, driver, application program, or other program of instructions executing on processor 103), such functionality may be performed by a processor other than a central processing unit of information handling system 102. For example, in some embodiments, processor 103 may comprise a specialty purpose controller associated with the push button or other interface device of user interface 110 (e.g., a controller on a printed circuit board including logic for the push button or other interface device) with functionality embodied in hardware, firmware, or a combination thereof in order to carry out the disclosed functionality.

FIG. 2 illustrates a flow chart of an example method 200 for processing of physical interaction with an interface device of an information handling system based on sensor information indicative of human proximity, in accordance with certain embodiments of the present disclosure. According to some embodiments, method 200 may begin at step 202. As noted above, teachings of the present disclosure may be implemented in a variety of configurations of information handling system 102.

At step 202, processor 103 may, in response to a physical interaction with a push button or other interface device of user interface 110, read information from one or more sensors (other than the push button or other interface device itself), such as, for example, one or more of capacitive sensor 124 (e.g., either integrated or independent from the push button or other interface device), accelerometer 126, temperature sensor 128 (e.g., either integrated or independent from the push button or other interface device), fingerprint reader 130 (e.g., either integrated or independent from the push button or other interface device), and camera 132.

At step 204, processor 103 may determine whether information from the one or more sensors satisfies a condition indicative of human proximity to the push button or other interface device, as such a condition is described above. If the condition indicative of human proximity to the push button or other interface device is satisfied, method 200 may proceed to step 206. Otherwise, method 200 may proceed to step 208.

At step 206, in response to the condition indicative of human proximity to the push button or other interface device being satisfied, processor 103 may enable functionality associated with user interaction with the push button or other interface device (e.g., power on, power off, erase memory). After completion of step 206, method 200 may end.

At step 208, in response to the condition indicative of human proximity to the push button or other interface device not being satisfied, processor 103 may disable functionality associated with user interaction with the push button or other interface device. After completion of step 208, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
 a user interface comprising an interface device;
 one or more sensors, each respective sensor configured to detect a respective parameter indicative of human proximity to the interface device, wherein the one or more sensors includes an accelerometer configured to determine a gravitational orientation of the information handling system; and
 a processor communicatively coupled to the user interface and the one or more sensors and configured to:
  in response to a physical interaction with the interface device, read information from the one or more sensors, wherein the physical interaction is configured to cause functionality comprising erasing a non-volatile memory of the information handling system;
  determine whether the information from the one or more sensors satisfies a condition indicative of human proximity to the interface device, wherein the condition includes the gravitational orientation of the information handling system being consistent with a typical use manner of the information handling system; and
  process the physical interaction with the interface device based on whether the condition is satisfied.

2. The information handling system of claim 1, wherein the processor is further configured to, responsive to the condition being satisfied, enable the functionality.

3. The information handling system of claim 2, wherein the functionality further comprises one of powering on the information handling system and powering off the information handling system, and wherein a temporal length of the physical interaction is configured to distinguish among different functionalities.

4. The information handling system of claim 1, wherein the processor is further configured to, responsive to the condition being unsatisfied, disable the functionality.

5. The information handling system of claim 4, wherein the functionality further comprises one of powering on the information handling system and powering off the information handling system, and wherein a temporal length of the physical interaction is configured to distinguish among different functionalities.

6. The information handling system of claim 1, wherein the interface device is a push button.

7. The information handling system of claim 1, wherein the one or more sensors comprise one or more of a capacitive sensor, a temperature sensor, a fingerprint reader, a camera, a photo sensor, a specific absorption rate sensor, an acoustic sensor, a moisture sensor, a radio frequency detector, and an infrared sensor.

8. A method, for use in an information handling system comprising a user interface comprising an interface device and one or more sensors, each respective sensor configured to detect a respective parameter indicative of human proximity to the interface device, wherein the one or more sensors includes an accelerometer configured to determine a gravitational orientation of the information handling system, the method comprising:
 in response to a physical interaction with the interface device, reading information from the one or more sensors, wherein the physical interaction is configured to cause functionality comprising erasing a non-volatile memory of the information handling system;
 determining whether the information from the one or more sensors satisfies a condition indicative of human proximity to the interface device, wherein the condition includes the gravitational orientation of the information handling system being consistent with a typical use manner of the information handling system; and
 processing the physical interaction with the interface device based on whether the condition is satisfied.

9. The method of claim 8, further comprising, responsive to the condition being satisfied, enabling the functionality.

10. The method of claim 9, wherein the functionality further comprises one of powering on the information handling system and powering off the information handling system, and wherein a temporal length of the physical interaction is configured to distinguish among different functionalities.

11. The method of claim 8, further comprising, responsive to the condition being unsatisfied, disabling the functionality.

12. The method of claim 11, wherein the functionality further comprises one of powering on the information handling system and powering off the information handling system, and wherein a temporal length of the physical interaction is configured to distinguish among different functionalities.

13. The method of claim 8, wherein the interface device is a push button.

14. The method of claim 8, wherein the one or more sensors comprise one or more of a capacitive sensor, a temperature sensor, a fingerprint reader, a camera, a photo sensor, a specific absorption rate sensor, an acoustic sensor, a moisture sensor, a radio frequency detector, and an infrared sensor.

15. An article of manufacture comprising:
 a non-transitory computer-readable medium; and
 computer-executable instructions carried on the computer-readable medium, the instructions readable by a processor, the instructions, when read and executed, for causing the processor to, in an information handling system comprising a user interface comprising an interface device and one or more sensors, each respective sensor configured to detect a respective parameter indicative of human proximity to the interface device, wherein the one or more sensors includes an accelerometer configured to determine a gravitational orientation of the information handling system:
  in response to a physical interaction with the interface device, read information from the one or more sensors, wherein the physical interaction is configured to cause functionality comprising erasing a non-volatile memory of the information handling system;
  determine whether the information from the one or more sensors satisfies a condition indicative of human proximity to the interface device, wherein the condition includes the gravitational orientation of the information handling system being consistent with a typical use manner of the information handling system; and
  process the physical interaction with the interface device based on whether the condition is satisfied.

16. The article of claim 15, the instructions for further causing the processor to, responsive to the condition being satisfied, enable the functionality.

17. The article of claim 16, wherein the functionality further comprises one of powering on the information handling system and powering off the information handling system, and wherein a temporal length of the physical interaction is configured to distinguish among different functionalities.

18. The article of claim 15, the instructions for further causing the processor to, responsive to the condition being unsatisfied, disable the functionality.

19. The article of claim 18, wherein the functionality further comprises one of powering on the information handling system and powering off the information handling system, and wherein a temporal length of the physical interaction is configured to distinguish among different functionalities.

20. The article of claim 15, wherein the interface device is a push button.

21. The article of claim 15, wherein the one or more sensors comprise one or more of a capacitive sensor, a temperature sensor, a fingerprint reader, a camera, a photo sensor, a specific absorption rate sensor, an acoustic sensor, a moisture sensor, a radio frequency detector, and an infrared sensor.

* * * * *